Figure 1:
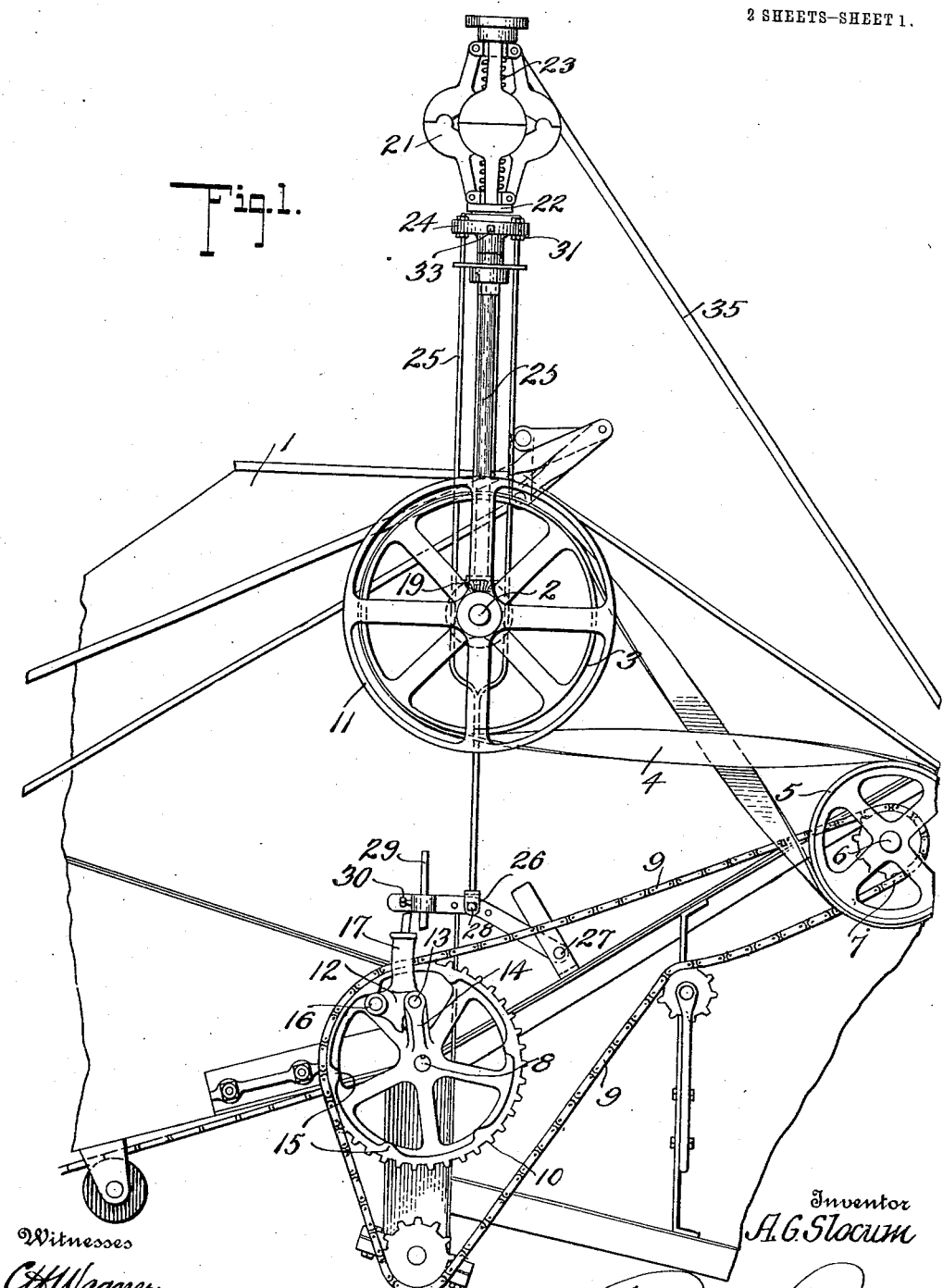

A. G. SLOCUM.
SELF FEEDER FOR THRESHING MACHINES.
APPLICATION FILED JUNE 23, 1914.

1,123,028.

Patented Dec. 29, 1914.
2 SHEETS—SHEET 1.

Witnesses
C. H. Wagner
D. R. Partello

Inventor
A. G. Slocum
By Robb & Robb
Attorneys

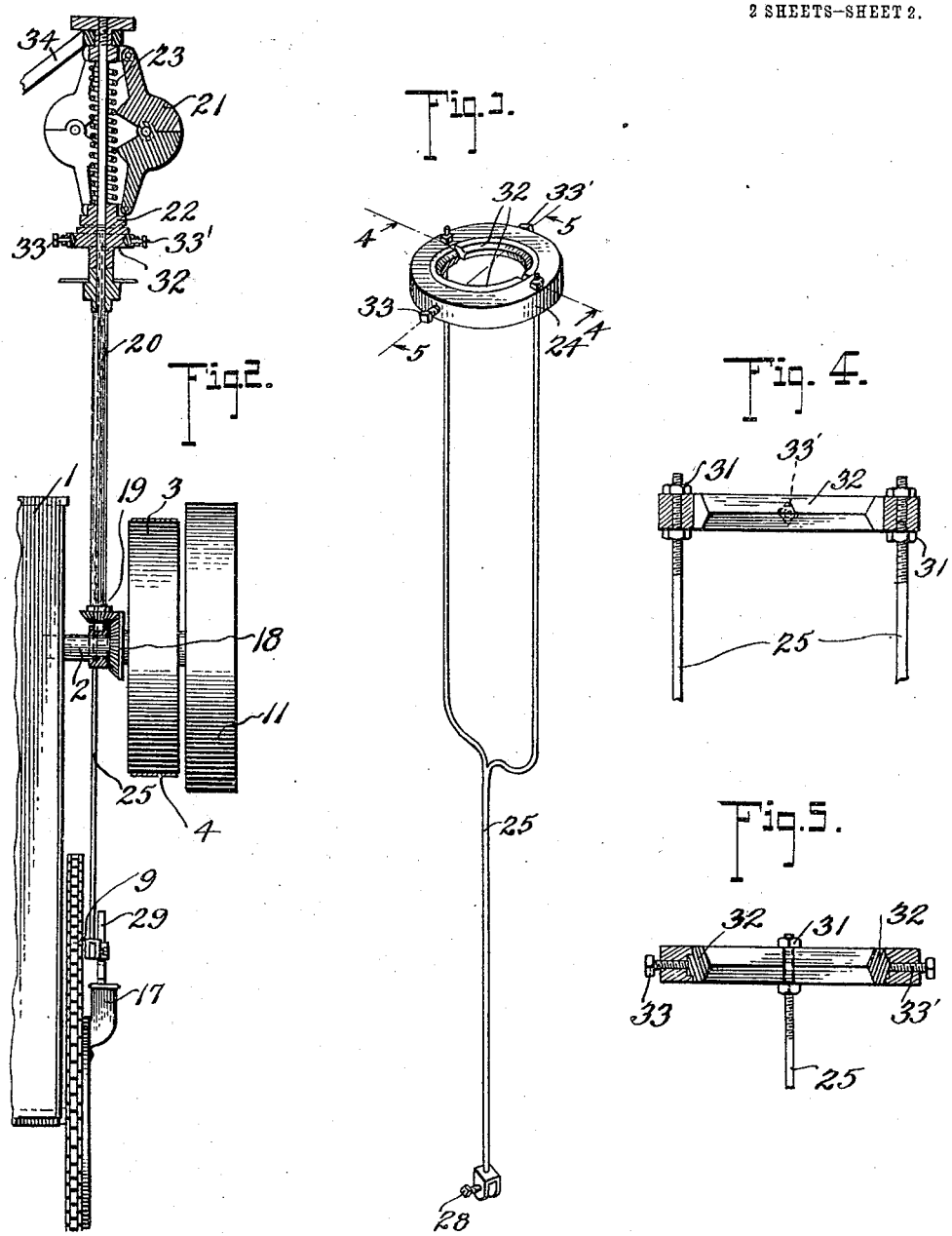

UNITED STATES PATENT OFFICE.

ARTHUR G. SLOCUM, OF ENSIGN, KANSAS.

SELF-FEEDER FOR THRESHING-MACHINES.

1,123,028.  Specification of Letters Patent.  Patented Dec. 29, 1914.

Application filed June 23, 1914. Serial No. 846,844.

*To all whom it may concern:*

Be it known that I, ARTHUR G. SLOCUM, a citizen of the United States, residing at Ensign, in the county of Gray and State of Kansas, have invented certain new and useful Improvements in Self-Feeders for Threshing-Machines, of which the following is a specification.

In general the present invention relates to improvements in agricultural machinery, and particularly to that class of threshing machines embodying automatic self-feeding mechanism.

The object in view is to provide in combination with a speed controlled governor for the feeder shaft of adjustable stop mechanism for automatically rendering temporarily inoperative the grain feeding mechanism for the thresher when the speed of said feeder shaft falls below a predetermined rate for effectively performing its function, thus eliminating likelihood of "choking" the thresher cylinder or so retarding the power means for the same as to be inadequate to accomplish the proper operation of the machine and the disintegration of the grain passing therethrough.

To this end the invention consists in the provision of a speed governor operated by the feeder shaft, and an adjustable stop member adapted to coact with the grain carrier when the speed of the governor falls below normal, actuating means for said stop member, and connecting means intermediate said governor and the actuating means aforesaid peculiarly adjustable to regulate the coöperation with the feeding mechanism.

A further object in view is to provide a special form of connection for the connecting means hereinbefore mentioned with the governor whereby to permit of its adjustment to take up wear and tear incident to the support of the weight of the stop means by the rotating governor elements.

These and such other objects as may hereinafter appear are attained by the novel construction, combination and arrangement of parts to be hereinafter specifically described and claimed.

Reference will now be had to the accompanying drawings forming a part of this specification, wherein:—

Figure 1 is a fragmentary side elevation of a feeder for threshing machines showing the application of my invention thereto; Fig. 2 is an end elevation of the device, parts being shown in section to bring out more clearly the details of construction; Fig. 3 is a perspective view of the connecting means intermediate the governor and the stop member; Fig. 4 is a fragmentary sectional view taken on the plane indicated by the line 4—4 of Fig. 3; and Fig. 5 is a similar section at right angles to that of Fig. 4, taken on the line 5—5 of Fig. 3.

Referring to the drawings, the numeral 1 designates the frame of the feeder mechanism which is of a conventional type and associated with the threshing machine, the details of which forming no part of my invention are not shown. The self feeder is provided with the usual main feeder shaft 2 carrying at its outer extremity the pulley 3 which is operatively connected by means of a belt 4 to the pulley 5 of the threshing cylinder shaft 6. Said cylinder shaft also carries a sprocket 7 for transmission of power to the carrier shaft 8 through the instrumentality of the chain 9 which passes over a drive sprocket 10 loosely mounted upon said carrier shaft. The feeder shaft and thresher cylinder shaft are driven from a suitable source of power which may be operatively connected to the pulley 11 of the feeder shaft adjacent the pulley 3 hereinbefore mentioned. Motion is transmitted to the carrier shaft 8 so long as the clutch pawl 12, which is pivotally connected at 13 to the arm 14 secured in turn fixedly to the feeder shaft, is interlocked with the driving sprocket 10, the latter being provided at its periphery with a plurality of lugs 15 adapted to engage with a roller 16 carried by said pawl. This type of clutch is of conventional form and does not need to be more particularly described in the present instance. The pawl 12, however, is formed with an offstanding arm 17 which is adapted to coact with certain stop mechanism, now to be described, when it is desired to disengage the driving means from the carrier shaft so as to discontinue the motion of the grain carrier operated thereby.

As shown particularly in Fig. 2, the feeder shaft 2 is provided with a bevel gear 18 adjacent the pulley 3 which intermeshes with a similar gear 19 carried by the lower extremity of a vertically disposed shaft 20 carrying the balled speed governor 21. The balls of said governor are fixedly secured to the shaft 20 at its upper extremity while they are provided with a loose connection at their lower extremity so that as the shaft 20 is actuated or rotated by the feeder shaft 2 this lower connection or collar 22 is raised by centrifugal action against the spiral spring 23 interposed between said collar and the upper fixed connection of the ball. Directly associated with the collar 22 is a larger collar 24 to which the upper extremities of a stirrup 25 are adjustably connected, said stirrup forming connecting means intermediate the governor 21 and the arm 26 pivotally secured at 27 to the feeder frame adjacent the driving sprocket 10 of the carrier shaft 8, said stirrup being detachably secured to said arm as indicated at 28 by means of a set screw extending through a bifurcated extremity of the stirrup, the point of connection with respect to the arm pivot controlling the size of the arc in which the arm will swing. It will be perfectly obvious that the detachable connection 28 of the stirrup may be shifted within a substantial range longitudinally of the arm so as to regulate the extent of vertical movement of said arm, this regulating means being only one of several methods of adjustment of these parts as will be hereinafter more particularly pointed out. The arm 26 carries near its outer extremity a stop member 29 adjustably secured to said arm by means of a set screw 30 so that it is apparent that the member 29 may be raised or lowered in its position on the arm 26 which adjustment will obviously control the coöperation of this stop member with the arm 17 of the clutch pawl 12.

As hereinbefore premised, the upper ends of the stirrup 25 are adjustably connected to the collar 24 by means of the adjusting nuts 31 so that it is possible to raise and lower the normal position of the arm 26 by this means and this in turn also controls the abutting coöperation of the member 29 with the arm 17. The collar 24 surrounds the movable collar 22 of the governor which is provided with a groove to accommodate the segmental clamping shoes 32 disposed within the collar 24 and movably attached thereto through the instrumentality of the set screws 33, 33′ passing through the collar 24 from opposite sides. As will be noted by reference to Figs. 4 and 5 particularly, these shoes are beveled on their inner faces to conform to the V-shaped groove of the collar 24 and since the shoes remain stationary while the collar revolves during actuation of the governor, considerable wear results at this point of connection. In order to take up lost motion or wear it is only necessary to screw the screws 33, 33′ inwardly so as to move the shoes 32 farther into the grooves.

It will be apparent from the foregoing that one of my main objects is to provide a wide range of adjustment of the elements of my stopping mechanism so that the adjustment of said stopping mechanism may be accomplished quickly, depending upon the actual conditions existing during the use of the machine. For example, it may be mentioned that the attachment when connected to one machine might require the adjustment of the arm 26 at a different horizontal plane from that which would be desirable when the attachment is connected to a different machine of the same class. The contact or abutment of the member 29 with the clutch pawl 17 being such that breakage often occurs, it is an easy matter to insert a new stop member or readjust a broken one when such necessity arises with my arrangement. The governor is preferably supported in the vertical position shown above the feeder shaft by means of braces 34, 35.

The operation of my attachment may be briefly summarized in the following manner: The grain carrier of the self feeder (not shown) under ordinary conditions of operation supplies the grain to the thresher cylinder but it is requisite that said carrier should be rendered inoperative for feeding purposes when the cylinder receives an overcharge choking up the machine with the grain and interfering with the proper operation of the mechanism. The governor 21 is operated from the feeder shaft which revolves at a predetermined number of revolutions and when it has acquired the proper speed it raises the arm 26 through the connecting stirrup 25 so as to carry the stop member 29 out of the path of the arm 17 of the clutch pawl 12 which connects the drive sprocket 10 to the carrier shaft 8. Under the condition just mentioned above of choking of the thresher cylinder the speed of the governor 21 is reduced allowing the arm 26 to move downwardly until its adjustable stop member 29 moves into the path of rotation of the arm 17 of the clutch pawl 12, immediately disconnecting the carrier shaft from the driving means therefor and when the thresher cylinder has had ample time to clear itself the speed of the feeder shaft 2 increases causing the governer 21 to raise the arm 26 and again connect the carrier shaft to the driving means.

Having thus described the invention, what is claimed as new is:—

1. In a device of the class described, the combination with a main feeder shaft and grain feeding mechanism, of a speed controlled governor operable by said shaft, driving means for said feeder shaft, and feeding mechanism including a clutch, an operating arm associated with the clutch aforesaid, an adjustable stop member carried by said arm, and connecting means intermediate the governor and the arm having a connection shiftable along the latter for moving the stop member into and out of the path of the clutch to render the feeding mechanism respectively inoperative or operative in relation to the driving means aforesaid.

2. In a device of the class described, the combination with a main feeder shaft and grain feeding mechanism, of a speed controlled governor operable by said shaft, driving means for said feeder shaft, and feeding mechanism including a clutch, an operating arm pivotally mounted adjacent the clutch aforesaid, an adjustable stop member carried by the free end of said arm, connecting means intermediate the governor and the arm for moving the stop member into and out of the path of the clutch to render the feeding mechanism respectively inoperative or operative in relation to the driving means aforesaid, and means for adjusting the connecting means longitudinally of the arm to govern the extent of arcuate movement of the operating arm with respect to the clutch member according to a predetermined speed of the governor.

3. In a device of the class described, the combination with a main feeder shaft and a carrier shaft, of a speed controlled governor operatively connected to the feeder shaft, driving means for driving the feeder and carrier shafts, a clutch member intermediate the carrier shaft and its driving means, an operating arm pivotally mounted at one end adjacent to the carrier shaft, a stop member adjustably secured to the arm for vertical adjustment and adapted to coöperate with the clutch member in one position to render the driving means inoperative with respect to the carrier shaft, and movable into another position to cause actuation of said carrier shaft by the driving means, and a stirrup connected at one end to the governor and at its other end to a point intermediate the length of the operating arm, said latter connection being shiftable to vary the swing of the arm upon actuation of the stirrup by the governor whereby to move the arm according to a predetermined speed of the feeder shaft into and out of relation with the clutch member.

4. In a device of the class described, the combination with a main feeder shaft and a carrier shaft, of a speed controlled governor operatively connected to the feeder shaft, driving means for driving the feeder and carrier shafts, a clutch member intermediate the carrier shaft and its driving means, an operating arm pivotally mounted adjacent to the carrier shaft, a stop member secured to the arm and adapted to coöperate with the clutch member in one position to render the driving means inoperative with respect to the carrier shaft, and movable into another position to cause actuation of said carrier shaft by the driving means, and a stirrup adjustably connected at one end to the governor and at its other end adjustably connected to the operating arm intermediate its pivot and the stop member carried thereby whereby to regulate coöperation of the stop member with the clutch member at a predetermined speed of the governor.

5. In a device of the class described, the combination with a main feeder shaft and a grain feeding mechanism including a clutch member, driving means for said feeder shaft and feeding mechanism, a speed governor operatively connected to the feeder shaft, a stop member adapted to coöperate with the clutch member, connecting means intermediate the stop member and the governor and comprising a stirrup, an annularly grooved collar to which the stirrup is adjustably connected at one end, and adjustable clamping shoes disposed in the groove of said collar and connecting the collar to the governor.

In testimony whereof I affix my signature in presence of two witnesses.

ARTHUR G. SLOCUM.

Witnesses:
MYRTLE SLOCUM,
JAY DAWSON.

Copies of this patent may be obtained for five cents each, by addressing the "Commissioner of Patents, Washington, D. C."